Dec. 12, 1933.  F. W. JACKMAN ET AL  1,939,304
METHOD OF MAKING COMPOSITE PHOTOGRAPHS
Filed June 12, 1929
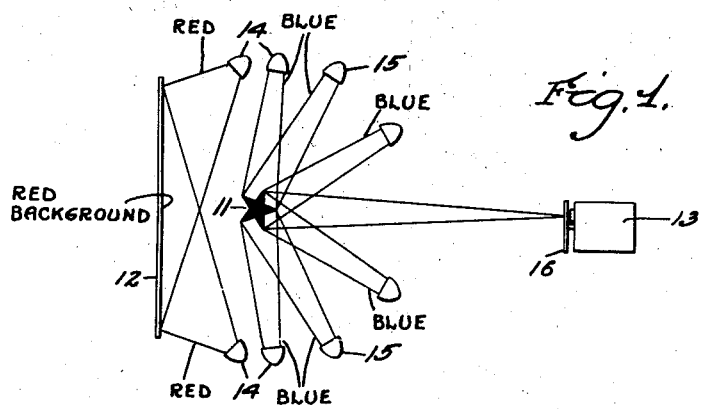
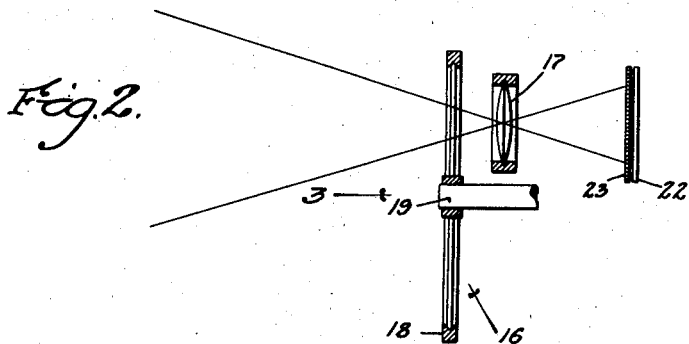
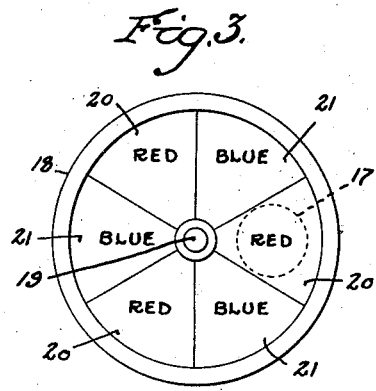
INVENTORS
FRED. W. JACKMAN AND
By HANS F. KOENEKAMP
ATTORNEY

Patented Dec. 12, 1933

1,939,304

UNITED STATES PATENT OFFICE 1,939,304

METHOD OF MAKING COMPOSITE PHOTOGRAPHS

Fred W. Jackman, Beverly Hills, and Hans F. Koenekamp, Los Angeles, Calif., assignors to Warner Bros. Pictures, Inc., New York, N. Y., a corporation of Delaware Application June 12, 1929. Serial No. 370,297

7 Claims. (Cl. 88—16)

This invention pertains to the art of photography and has to do with the production of composite pictures by photographically superposing, upon an actinic surface, a foreground or action component and a background component, such photographic superposition of components or images being effected from a single point of view and in a single step or operation.

A composite picture, as the term implies, differs from the ordinary type of picture in that the components forming the final composite picture are derived from independent sources. In other words, two or more independent images are combined to produce a final picture in which the images appear to have been photographed in a single scene. For instance, an actor or a group of actors whose optical image will be hereinafter referred to as the "action component" may be photographed in a studio, and at the same time, or subsequent thereto, the image produced in the camera may be introduced into or combined with a previously photographed exterior or other scene, which will be hereinafter referred to as the "background component" to produce, in effect, a picture of the actors before a "foreign background".

The production of composite pictures has, in recent years, come to be a highly specialized art in the motion picture industry, where overhead expenses are tremendous and the frequently crude and unsatisfactory results of so called "trick photography" or double exposure processes are severely criticized.

Most of the methods which are in use at the present time involve what is referred to above as a double exposure. In these methods, the photographic film is exposed once to the action or a picture thereof, and again to the background or a picture thereof, the latent image of the action resulting from the first exposure being protected by a suitable mat during the second exposure.

In other methods or processes, it has been attempted to produce composite pictures in a single photographic step or exposure by using a transparency dye-toned to as nearly as possible a single elementary color, carrying a background picture, and photographing the action through such transparency onto a panchromatic film.

The action is illuminated with light of substantially the same color as the transparency, and is photographed before a background colored substantially complementary to the color of the transparency, the object being to print the picture carried by the transparency onto the panchromatic film by means of the light coming from the background, at the same time photographing the image of the action through the transparency onto the panchromatic film. A color balance is maintained between the background, the action, and the transparency, which will, theoretically as well as practically, if proper precautions are taken, preclude the possibility of any of the picture on the transparency being printed through the region occupied by the image of the action. It is important in the practice of these processes that the colors used in the transparency and in the illumination of the action and the background be as nearly as possible true complementary colors. The process of making composite pictures by color separation, wherein selective exposure of different parts of the final negative film exclusively to the foreground and background components, respectively, is obtained, is described and claimed in the application, Ser. No. 535,061, filed May 4, 1931, by Fred W. Jackman, for Method of producing composite pictures.

The method contemplated by our invention is directed to an improvement in the latter method outlined above. In the use of the last mentioned method, it has been found that, due possibly to the difficulty in maintaining a proper color balance between the illumination and the transparency, as outlined above, there is always a tendency for the background picture to be printed into the region occupied by the image of the action. In other words, the image of the action is marred by ghost or phantom lines of the background, unless proper care is exercised.

Attempts have been made, in the practice of the methods now in use, to eliminate the ghost or phantom lines mentioned above, (which appear when there is not proper color separation as described hereinafter) by eliminating all of the sharp or hard contrasting portion from the background component. This is done by making a very soft or flat reproduction of the background image which necessarily gives the resultant composite picture a cheap, unsatisfactory appearance, wherein the contrast and detail in the foreground component are not balanced with the contrast and detail of the background component.

It has also been found in the usual practice of this method that in the event any of the colored light used to illuminate the action is reflected or directed upon the background, the background picture on the transparency is printed unevenly in the final composite negative. This necessitates the arrangement of the lights used to illuminate the action in a manner such that none of this light will reach the background, and makes it impossible to obtain the best relation between the high lights and shadows in the image of the action. Nevertheless, a commercial product can thus be obtained.

It is the primary object of the method contemplated by this invention to eliminate the two highly undesirable effects mentioned above by intermittently passing the light coming from the action and the background through color filters which are of substantially the same color as the light used to illuminate the action and the background respectively. In other words, each composite picture formed upon the actinic surface or panchromatic film behind the background transparency, instead of being exposed directly through a clear lens, is exposed one or more times through a color filter which is preferably complementary to the color of the background, and one or more times through a filter which is preferably complementary to the color of the light with which the action is illuminated.

The process contemplated by our invention is, therefore, in effect, a method for making composite pictures in a single photographic operation and from a single point of view, wherein an actinic surface (panchromatic film) is intermittently exposed behind a dye-toned (say blue) transparency of a background picture through complementary colored filters (blue and red) to action which is illuminated with light of a color substantially the same as the color of the transparency (blue), the action being positioned in front of a background which is of a color (red) complementary to the color of the transparency.

Although the invention is more or less specifically described above in connection with complementary colors, it is to be emphasized that a noteworthy feature of the invention resides in the fact that the method contemplated thereby is not necessarily confined to the use of complementary colors, and that by using filters colored the same as the two light sources, the two sources of illumination may be of colors which are not strictly complementary. In other words, one filter element will only permit the passage of light of the same color as such filter, and the other filter element will permit passage of no light other than that of its color.

We have found in the practice of our invention that composite pictures made by our improved method do not contain the ghost or phantom effect found in pictures produced by the ordinary method, as outlined in the forepart of the specification.

We have also found that any of the colored light used to illuminate the action which may be projected upon the background is removed by the red filter, so that the background component is printed uniformly in the final composite picture, regardless of the arrangement of the lights illuminating the action. Our method, therefore, makes it possible to obtain, in a single photographic operation, a composite negative in which there is no ghost effect and in which the action is illuminated to bring out the proper relation between the high lights and shadows.

The details in the procedure used in the practice of our invention will be best understood from the following description of a preferred method, reference being made to the accompanying drawing, which is chosen for illustrative purposes only, and in which Fig. 1 is a diagrammatic view, showing a typical arrangement for carrying out our method.

Fig. 2 is an enlarged diagrammatic view illustrating one manner of arranging the films with respect to a camera lens and a filter element, and Fig. 3 is a view which may be considered as having been taken in the direction of the arrow 3 in Fig. 2.

It is to be understood that, while we will, in the description of our invention, refer to the background as being red, the transparency as being blue, and the action as being illuminated with blue light, these colors are chosen solely for the purpose of describing the invention, and that many systems or sets of colors which may or may not be complementary, can be employed without departing from the scope of the invention as outlined in the appended claims.

It is also to be understood that, while we have chosen, for the purpose of illustrating the invention, a preferred form of disk type filtering element, showing the same as being positioned in front of the camera lens, this element may be varied, both in construction and position. It may for instance, be positioned behind the lens, or, if desired, may be made a part of the camera shutter. Such changes will, no doubt, be readily apparent to those familiar with the art after a brief study of the accompanying illustrations and the following description.

In the practice of our invention, as outlined above, the action 11 (which may consist of an actor or several actors) is positioned in front of a plain or colored background 12 in the line of vision of the camera 13.

The background 12 may be in the form of a red drape, and is shown as being illuminated by means of red lights 14.

The action 11 is illuminated by means of blue lights 15, which, in the practice of our invention, may be arranged in any desired manner to obtain the proper balance of high lights and shadows in the action.

The camera 13 may be any standard type of motion picture (or other) camera, and is provided with a novel filtering element 16, shown as being positioned in front of a lens 17 and comprising a wheel 18, mounted upon a rotatable shaft 19.

The wheel 18 is provided with a plurality of red and blue filter segments 20 and 21, which are subtractive to the colors used in illuminating the action and the background respectively.

An actinic surface in the form of a panchromatic film 22, which is sensitive to the two colors used in the practice of our invention, is positioned in the camera behind the lens 17, and a blue transparency 23, carrying the background image, is positioned in the focal plane of the lens in front of the panchromatic film 22.

The transparency may be, as shown, a positive film (similar in form to the film 22), in which the silver deposit which originally defined the background image on the film has been replaced with a suitable blue dye which varies in density with the high lights and shadows of the background image, or it may be in the form of a transparent plate having the background picture painted thereon and positioned in front of the lens 17, where it will be in focus with the foreground component.

In any event, it will be understood that the blue light coming from the action 11 will, at such times as a blue filter segment is before the lens 17, pass directly through the transparency, exposing the film 22 to the image of the action 11. Any red light coming from the action 11, and all of the red light coming from the background 12, is removed by this blue filter, so that the only impression made upon the film 22, when a blue filter segment 21 is before the lens, is a clean-cut image of the action 11.

As the red filter segment 20 is revolved in front of the lens 17, the blue light coming from the image 11 is removed, as is also all of the blue light which may be directed upon the red background, so that the film 22 during this step of the operation receives uniformly distributed red light which is effective, in the manner well known to those familiar with the art, to print upon the fresh sensitized film 22 all of that part of the background scene which is not occupied by the action image.

As has been hereinbefore pointed out, in the use of our method in cinematography, the rotation of the filter element is timed with the movement of the film in the camera, so that each frame in the film is exposed for the proper time through the respective filter segments. The duration of the exposure of the separate colors can be balanced by changing the width of the filter segments.

We have found in the practice of our invention that the resultant composite negatives obtained through the use of our method are far superior to those obtained by the ordinary procedure outlined in the forepart of the specification, that the phantom effect or diffusion of the background image with the action image is entirely eliminated, and the background image is printed uniformly, even through part of the light illuminating the action is projected onto the background.

It is again emphasized that, while we have herein described one particular method or procedure contemplated by our invention in connection with a preferred form of apparatus, the scope of the invention is not to be limited to the above description, but that various changes in the apparatus and the choice of colors will be readily apparent to those familiar with the art. For instance, the position and type of filter element may be modified, the position and type of the transparency may be modified, and the use of the filter elements as described makes it possible to use colors which are not strictly complementary. The invention therefore resides largely in the intermittent exposure of an actinic surface to light coming from differently colored sources of illumination through filter elements, each of which is subtractive to the light from one of the sources of illumination, a transparency being placed before the actinic surface, which is the same color as one of the sources of illumination. The invention is not, therefore, limited to the precise procedure set forth above, but includes within its scope whatever changes fairly come within the spirit of the appended claims.

We claim as our invention:

1. The method of making composite pictures, wherein an actinic surface is intermittently exposed behind a colored transparency of a background component through differently colored filters, one of which is substantially the same color as said transparency, to an action component which is illuminated with light of a color substantially the same as the color of the transparency, said action component being positioned before a background of the same color as the color of the other filter.

2. The method of producing a composite negative, which includes making a transparent colored positive of a background component, placing a panchromatic film in a camera behind said positive, illuminating an action component with light of substantially the same color as the color of said positive, projecting the image of the action component through a filter of the same color as said positive onto said panchromatic film, and printing that part of the image of said background component which is not occupied by the image of the action component onto the panchromatic film by illuminating same with light of a color complementary to the color of the positive film.

3. The method of producing a composite negative, which includes arranging an action component before a colored background, illuminating the action component with light of a color substantially complementary to the color of the background, placing a fresh actinic surface sensitive to both of said colors in a camera behind a transparency carrying a positive image of a background component colored complementary to the color of said background, and intermittently exposing said fresh actinic surface to the light from said action and said background respectively.

4. The method of producing a composite negative, which includes arranging an action component before a colored background, illuminating the action component with light of a color different from the color of the background, placing a fresh actinic surface sensitive to both of said colors in a camera behind a transparency carrying a positive image of a background component colored substantially the same as the color used in illuminating the action, and intermittently exposing said fresh actinic surface to the light from said action and said background respectively through filters of the same color as the light used in illuminating said action and said background.

5. The method of producing a composite negative which includes arranging an action component before a red background, illuminating the background with red light, illuminating the action component with blue light, placing a fresh actinic surface sensitive to both red and blue light in a camera behind a blue transparency carrying a positive image of a background component, and exposing said actinic surface intermittently through red and blue filters to light coming from said background and said action component.

6. The method of making composite photographs, wherein an actinic surface is intermittently exposed through different color filters and behind a positive film transparency of a background component wherein the silver deposit originally defining the background image has been replaced by a dye, one of the filters being substantially the same color as the colored image on the transparency, to an action component which is illuminated with light of a color substantially the same as the color of the image on the transparency, said action component being positioned before a background of the same color as the color of the other filter.

7. The method of producing a composite negative, which includes arranging an action component before a colored background, illuminating the action component with light of a color different from the color of the background, placing a fresh actinic surface sensitive to both of said colors in a camera behind a transparency carrying a positive image of a background component, said images being colored substantially the same as the color used in illuminating the action, and intermittently exposing said fresh actinic surface to the light from said action and said background respectively through filters of the same color as the light used in illuminating said action and said background.

FRED W. JACKMAN.
HANS F. KOENEKAMP.